3,518,963
SCHEDULING PANELS INCORPORATING ROTATABLE DIALS AND FLEXIBLE IDENTIFICATION MEDIA
Hartwell F. Tucker, Santa Clara County, Calif., assignor to Small Business Administration, an agency of the United States Government
Filed Apr. 26, 1965, Ser. No. 455,668
Int. Cl. G09f 9/00
U.S. Cl. 116—133          11 Claims

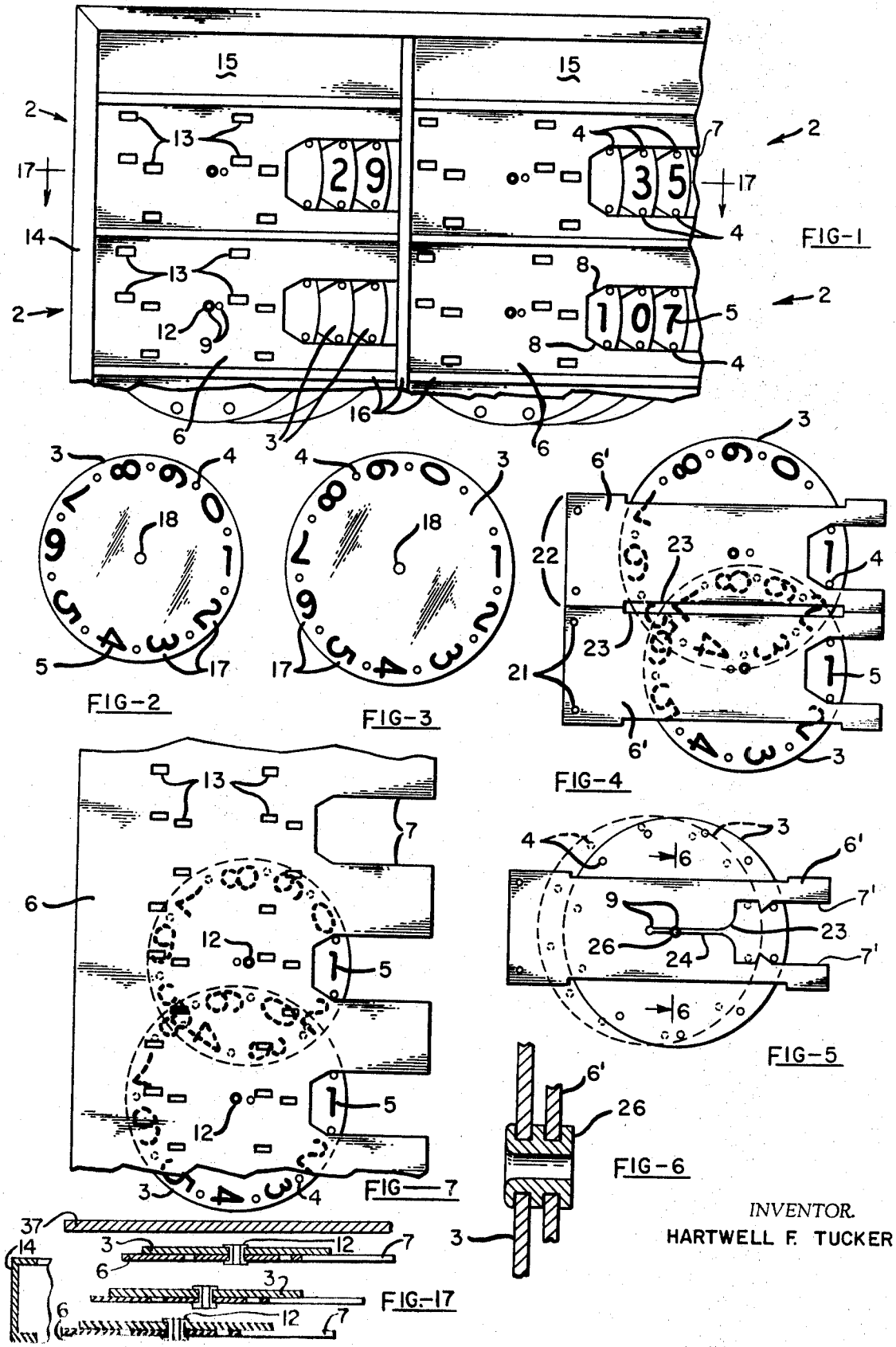

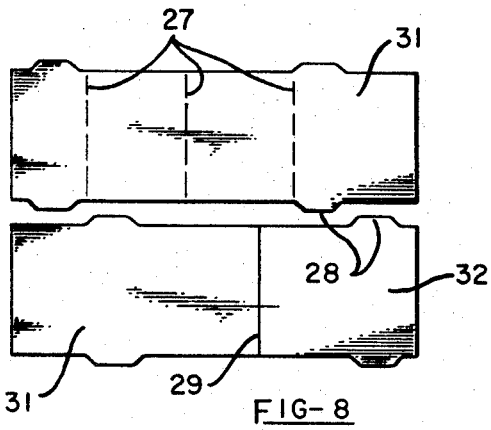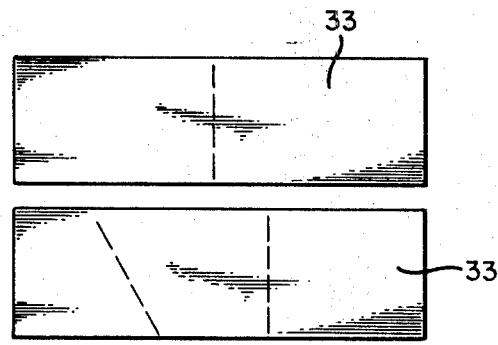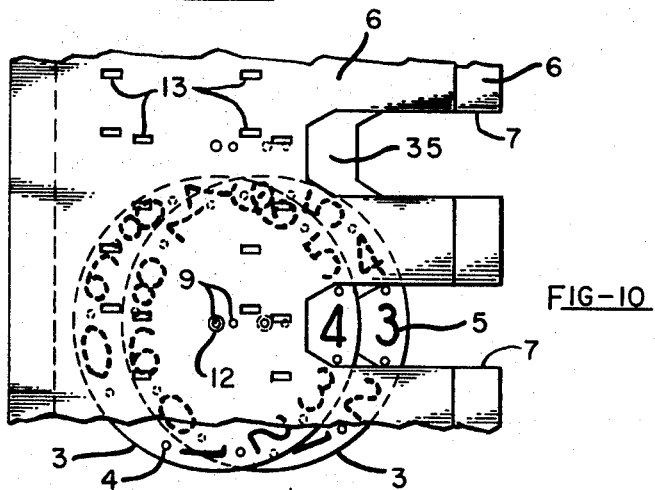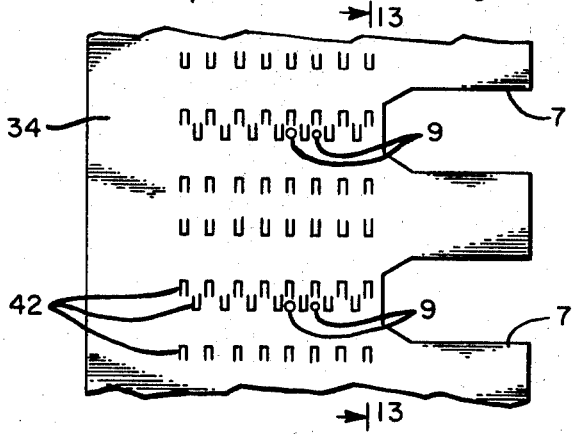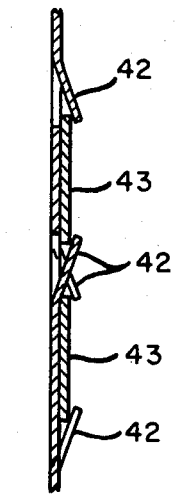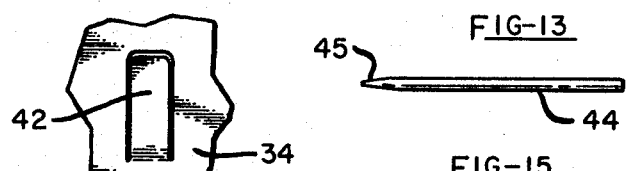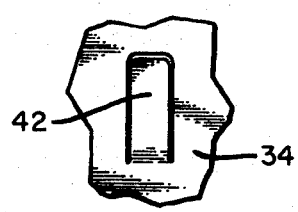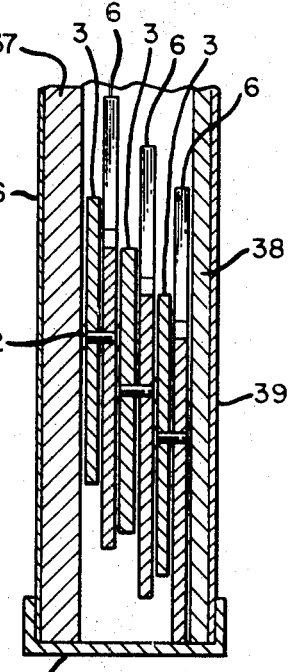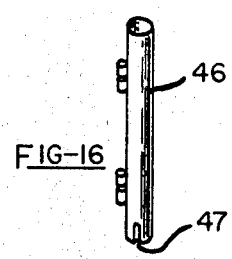
INVENTOR.
HARTWELL F. TUCKER United States Patent Office 3,518,963
Patented July 7, 1970

ABSTRACT OF THE DISCLOSURE

A scheduling panel is provided having a backing member of sheet material covered by an information holder frame which cooperates with a rotatable substantially circular information dial to display for ready observation a variety of information on many different subjects in which the information pertaining to any one subject is varied from time to time in relation to the other subjects.

BACKGROUND OF INVENTION

Many different activities require the performance of a scheduling function. Such scheduling function serves the purpose of keeping in orderly relationship different types of information or data some of which is variable and some of which is invariable. For example, secondary schools have a need to reflect the relationships between subjects taught, the periods during the day when such subjects are to be taught, the rooms in which such subjects will be taught, room capacities, teacher availability for such subjects, and academic level of students scheduled for such subjects. There is a growing trend to computerize this scheduling function but there remains the need for each teacher or each administrator to have convenient access to a visual aid which displays the relationships determined to be optimum for the given activity, whether that determination is made by computer or otherwise. Accordingly, it is the principal object of this invention to provide a scheduling panel which will provide a versatility in the presentation of variable information or data together with a great flexibility in the sizes, positioning and movability of accompanying identfying media.

It is another object of the invention to provide a scheduling panel incorporating rotatable dials and flexible identification media, the latter including a unique single piece of identification material which may be used in its entirety in a selected portion of an available identification area, while an additional identical piece of identification material may be rotated 180° and used in its entirety to supplement and fill the remaining available identification area.

Because of the varying nature of the data to be displayed, it is an advantage to increase the versatility of the device or means by which the data is displayed. Accordingly, it is another object of the invention to provide a unique single piece of identification material which may be cut apart vertically along predetermined perforated lines so that more than one piece may be created from one large piece to permit selective placement of the separate pieces in relation to each other and in relation to other pieces.

Inasmuch as the pieces constituting the information-carrying material are displayed on the scheduling panel, means are provided in the form of tabs on each piece to facilitate its retention on the selected identification area. The tabs on each piece are configured and positioned so that one or more tabs is provided for each division or smaller piece formed from a larger piece.

The efficient scheduling of an activity frequently requires that certain information or data recorded on an identification piece be moved to a different location or identification area on the schedule board. It is accordingly a still further object of the present invention to provide an identification piece on which may be inscribed information or data, the identification piece having the characterstic that it may be large enough to cover an entire identification area or manufactured in die-cut strips of smaller size to provide single type pieces encompassing only a portion of the entire identification area.

To facilitate removal and replacement of an identification piece from a given identification area, it is necessary that some means be provided by which the identification pieces may be secured to the schedule board. Accordingly, it is a still further object of the invention to provide each identification piece with a specially placed protruding tab adapted to be inserted into a specially positioned opening which incorporates an offset underlying opening to provide space to accommodate the inserted tab without undue bending or pressure being exerted on the protruding tab.

To function efficiently as a visual aid, it is advantageous that the scheduling panel have the flexibility to use five, six or more different shaped identification pieces. Accordingly, another object of the invention is the provision of a scheduling panel of the character described incorporating a face covering including means for securing different shaped identification pieces thereon.

To accommodate and provide means for displaying variable type data, means comprising a plurality of rotatable dials are provided having imprinted thereon selected indicia. The dials are arranged for rotation in relation to an aperture through which the indicia imprinted on each dial may be viewed.

Scheduling panels for use in scheduling various activities may advantageously be formed in different sizes. Accordingly, it is another object of the invention to provide a scheduling panel in which individual strips embodying rotatable dials and identification piece holders may be incorporated so as to provide a scheduling panel of any convenient size.

BRIEF SUMMARY OF INVENTION

In terms of broad inclusion, the scheduling panel of the invention comprises a supporting base on which are mounted one or more strips of card stock, each formed to provide a multiplicity of viewing apertures arranged to permit viewing of indicia imprinted on rotatable dials journaled on the strips. Means are provided for effecting rotation of the dials to display selected indicia from the underlying dial. Each of the strips is also provided with an area designated an identification area over which or on which may be secured an appropriate identification piece bearing data or information thereon for use in correlation with the indicia carried by the rotatable dials and adapted to be displayed through the apertures in the strip. The invention contemplates fabrication of the strips to encompass only a single aperture and a single rotatable dial, as well as a strip extended in length to carry a multiplicity of rotatable dials operating in conjunction with a multiplicity of identification areas and associated apertures. The invention also contemplates the transverse juxtaposition of similar strips so as to create a scheduling panel of any desired size.

DESCRIPTION OF DRAWINGS

FIG. 1 is a fragmentary front elevation of a scheduling panel illustrating eight identification areas and four apertures through which numerical data carried by rotatable dials is visible.

FIG. 2 is a front elevation of a ten division dial shown apart from the rest of the structure.

FIG. 3 is a front elevation of a modified dial incorporating eleven divisions. The dial is shown apart from the rest of the structure.

FIG. 4 is a front elevation of two individual dial holders and the dials supported thereon.

FIG. 5 is a front elevation of a modified holder and dial arrangement.

FIG. 6 is a fragmentary sectional view of a pivot post for supporting the dial in the assembly illustrated in FIG. 5.

FIG. 7 is a front elevational view of a holder strip shown with two dials of different sizes mounted thereon. Portions of the strip are broken away to shorten its length.

FIG. 8 is a front elevation of a pair of cooperating identification pieces shown apart from the rest of the structure.

FIG. 9 is a front elevational view of a modified identification piece.

FIG. 10 is a fragmentary front elevational view illustrating two holder strips of the type illustrated in FIG. 7 assembled in overlapped relationship to display their respective indicia through the openings provided in each holder for that purpose.

FIG. 11 is a vertical cross-sectional view in enlarged scale through a completed assembly.

FIG. 12 is a fragmentary front elevational view of a modified holder strip adapted to mount the type of identification piece illustrated in FIG. 9.

FIG. 13 is a fragmentary vertical cross-sectional view through a holder of the type illustrated in FIG. 12 and illustrating the manner in which the identification piece of FIG. 9 is held thereon.

FIG. 14 is a fragmentary front elevational view of one of the tabs formed in the holder strip of FIG. 12.

FIG. 15 is an elevational view of a pointed impeller useful in rotating the dials.

FIG. 16 is a perspective view of a tubular holder adapted to be mounted on the scheduling panel and provided to form a convenient means for containing the pointed impeller when the latter is not in use.

FIG. 17 is a horizontal cross-sectional view taken in the plane indicated by the line 17—17 in FIG. 1, but showing the various elevents in exploded relationship for clarity.

DESCRIPTION OF PREFERRED EMBODIMENT

Referring to FIG. 1, the scheduling panel includes a plurality of identification and figure data areas 2, each area having associated therewith a rotatable dial 3 provided adjacent its outer periphery with a series of propelling holes 4. The rotatable dials are journaled on holders 6, each of which may be formed as a single 6' unit as illustrated in FIGS. 4 and 5, or which may be formed in a continuous strip as illustrated in FIG. 7. In either case, each holder in an area adjacent the identification area is provided with a substantially rectangular opening the upper and lower edges 7, 7' of which serve as positive stops against which an impeller projecting into each of the propelling holes 4 may abut when each of the dials has been rotated a prescribed amount.

Each of the substantially rectangular openings is provided with inside corners 8 effective to mask from view adjacent figure data imprinted on the dials. The strip holders are also provided with two appropriately positioned holes 9 one of which may be selected for proper positioning of the dial so that the indicia or data imprinted thereon may be viewed through the aperture in the holder after assembly. The rotatable dial is journaled on the holder by an appropriate eyelet 12.

From the foregoing it will be ssen that either one of the rotatable dials illustrated in FIGS. 2 or 3 may be rotatably mounted on the holder 6 in association with the upper and lower edges 7 of the opening formed in the holder. With respect to the dial illustrated in FIG. 2, inasmuch as it is divided into ten equal intervals, it will be noted that when properly mounted such dial will be rotated through an arc of approximately 36°. The dial illustrated in FIG. 3 on the other hand, inasmuch as it incoproates a blank space in addition to the ten spaces utilized by the dial of FIG. 2, will be rotated through approximately 32° upon each rotation. It will thus be seen that by arranging a multiplicity of the holders 6 in superposed relationship (as illustrated in FIGS. 1 and 7) so that the axes of the rotatable dials all lie in a single plane but offset laterally along the plane a sufficient distance to expose the indicia on each dial arranged adjacent its outer periphery, an infinite number of combinations of numbers may be displayed in the rectangular openings formed in the holder. Thus, FIG. 1 illustrates settings for the dials in which no indicia is displayed a 2-digit number is displayed, and a 3-digit number is displayed in the various openings.

In order to support information pieces on the holder 6 in association with the indicia displayed through the rectangular apertures therein, each of the holders is provided with a plurality of openings 13, preferably eight in number, with four of the openings constituting a set and being positioned adjacent the upper and left edge of the holder 6, while the remaining four constitute a second set positioned adjacent the lower edge of the associated information area and offset to the right from the first set of apertures or openings. The sets of apertures 13 are arranged in correlation to the information pieces illustrated in FIG. 8, and function in cooperation therewith to retain such information pieces firmly locked to the holder 6.

To secure the holders 6 in appropriate position, the scheduling panel is enclosed around its outer periphery by a channel or suitable edging 14, within which is defined a title area 15, and across which are provided tape means 16 running horizontally and vertically across the panel to separate the information areas one from the other, to separate individual holders one from the other, and to aid in retaining the assembly of holders on the panel. The individual holders, whether or not in strip form, are preferably cemented to the base or back panel.

With reference to the rotatable dials illustrated in FIGS. 2 and 3, it will be noted that the dial illustrated in FIG. 2 is divided into ten equal divisions 17, each of which carries an appropriate indicia, with the divisions of the dial coinciding with propelling holes 4. A central aperture 18 formed in the dial serves to rotatably mount the dial on the holder. With respect to the dial illustrated in FIG. 3, it will be noted that this dial is divided into eleven equal divisions, each of which divisions, except one, carrying selected indicia means adapted to be displayed through the rectangular opening in the holder when a dial is mounted thereon. Because it is advantageous that the indicia marked on the dial illustrated in FIG. 2 be of the same size as the indicia imprinted on the dial illustrated in FIG. 3, but since there are eleven spaces in the latter dial instead of ten as in the former, it will be obvious that the dial illustrated in FIG. 3 must be somewhat larger than the dial illustrated in FIG. 2. To accommodate such larger dial, each of the holders 6 is provided with a pair of apertures 9 lying in a horizontal plane but offset laterally so that either dial may be mounted on a given holder so as to provide equal exposure through the aperture formed therein. This relationship is illustrated in FIG. 7.

In the embodiment of the invention illustrated in FIG. 4, the holder 6' has been modified so that in effect it encompasses a single identification area 2 and supports a single rotatable dial 3, a portion of the periphery of which is visible through the generally rectangular aperture or notch formed in one end edge of the holder. The opposite end edge of the holder is provided with a pair of positioning or locating holes 21, which lie closely adjacent end edge 22, proportioned in length so that when two separate holders are abutted along adjacent long edges as illustrated in FIG. 4 the apertures 9 are appropriately spaced to permit mounting of the dials as shown. Inasmuch as portions of two adjacent dials overlap, opposite long edges 23 of each of the holders is notched to relieve any pinching that might occur between the dials. It will of course be apparent that instead of using the width of the holders to control the spacing of the mounting holes for the dials, the positioning holes 21 could be utilized with appropriate indexing means (not shown) to properly position the holders.

The embodiment of the holder illustrated in FIG. 5 has been modified in that the viewing aperture formed in one end edge thereof has been provided with an additional opening or recess 23 which tapers into a slot 24 leading to and connecting with the dial positioning apertures 9. The slot possesses a slightly smaller diameter which serves to furnish frictional means to retain the dial pivoting means in proper position for rotation and use. The dials used in conjunction with this holder incorporate a stud-like eyelet 26 attached permanently to the dial in a manner to provide a projecting portion of the stud as a rotational axis for the dial. This construction is illustrated in FIG. 6. It will be apparent that this construction facilitates assembly of a rotatable dial on a holder in that the stud may be easily slipped through the slot 24, with the thickness of the holder being contained by the flanges, formed in the stud. Such a construction renders a dial equipped with the stud mountable and demountable at will.

The strip holder 6 illustrated in FIG. 7 is shown apart from the rest of the structure and clearly shows the relationship between the two different-sized dials illustrated in FIGS. 2 and 3 when journaled on the holder to provide equal exposure of a peripheral portion of each dial in the associated opening provided for that purpose.

To display information or data on the holder 6 in correlation to numerical data on the rotatable dials 3, the information area associated with each of the openings 7 formed in the edge of the holder is provided with a multiplicity of apertures, preferably eight in number, arranged in two sets as previously discussed. One set is offset laterally with respect to the other set as clearly shown in FIGS. 1 and 2. These apertures 13 are proportioned to receive tabs 28 formed on the long edges of information pieces 31 as shown in FIG. 8. To insert the tabs in the apertures, it is only necessary to grasp the information piece between two fingers, exert a small amount of pressure to bow the card stock from which the information piece is formed, and slip the tabs 28 into the associated apertures. Upon release of the piece its inherent resilience causes it to flatten out in a manner to engage the tabs in the holes.

As clearly known in FIG. 8, while the two information pieces illustrated are identical in configuration, they are shown reversed 180° so that the upper information piece is oriented to engage one set of apertures 13, while the tabs of the lower information piece are oriented to engage the lower set of apertures 13. From this interrelationship it will be seen that two information pieces may be utilized to completely cover the information area over which they are superposed. Alternatively, only one of the information pieces need be used, in which case one-half of the information area may contain invariable information while the other half is utilized to display variable information imprinted on the information piece and temporarily engaged with the holder in superposed relation to the underlying information area of the holder.

Where desired, each of the individual information pieces 31 may be severed along the lines 27, which are preferably lines of perforations so that small sections of each individual information piece may be detached from a larger piece and separately inserted in pairs of apertures 13. Obviously, the only criterion that need be met is that the information piece to be utilized possess at least two of the oppositely extending tabs 28.

The holder strips with rotatably mounted dials are preferably mounted together in a superposed assembly enclosed within a channel member 41 which forms a frame about the outer periphery of the assembly. Where the strips are superposed as shown in FIGS. 1, 7 and 10 the strips are adhesively secured to a back panel 37 having a covering 36. The facing strips 16 serve to separate one identification area from another, and separate one composite assembly of superposed strips from another as shown best in FIG. 1. It will be apparent that with this construction the holder strips 6 serve to support the information pieces 31 through interengagement of the tabs 28 on the information pieces with the correspondingly spaced apertures formed in each strip.

There are instances in which it is preferable that the information pieces be secured to the supporting holder in a superposed relationship over the information area thereon. This relationship is illustrated in FIGS. 12 and 13, in which the strip holder 34, suitably apertured adjacent one edge as previously discussed, is provided with a multiplicity of projecting tabs 42 elevated sufficiently in a sharp acute angle in the pattern shown to retain multiple identification pieces in a number of positions. Where this type of strip is used, the assembly illustrated in FIG. 11 is provided with a cover or facing sheet 38 incorporating suitable apertures for the display of the numerical and identification data. The facing sheet and the strip holders thereunder may be opened, like a door, inasmuch as they are flexible to permit such opening for the exchange of dials when desired, especially since the holders and facings are attached on the side furthermost from the aperture opening or openings.

Referring especially to FIGS. 12 and 13, it will be noted that the tabs 42 are arranged in rows, with corresponding tabs in opposed rows defining the associated information area. As illustrated in FIG. 12, a pair of widely spaced oppositely disposed rows of tabs define the entire identification area. Another row of tabs is medianly positioned between the widely spaced pair of rows, alternate tabs of the median row extending in opposite directions so as to provide the capability of converting the single large information area associated with the adjacent aperture into a pair of smaller information areas each of which is capable of receiving one of the information pieces 33 illustrated in FIG. 9. FIGS. 13 and 14 show that the tabs are struck from an integral sheet, it being understood that while the projecting tabs are shown slightly rounded at their free end other configurations such as triangular and square shapes may be utilized.

Inasmuch as it is undesirable that the rotating dials be grasped by the fingers to effect rotation, there is provided a pointed impeller 44 illustrated in FIG. 15 and having a tapered end section and a flattened point to advantageously cooperate with the propelling holes 4 and the edges 7 of the apertures to effect a predetermined degree of rotation of the rotatable dials. Since it is important that the pointed impeller be available when required, there is provided a cylindrical holder 46 for the impeller, the holder having a tapered or compressed lower extremity 47 and adapted through appropriate holding or support members to be attached to the scheduling panel.

I claim:

1. A scheduling panel for collating information to be displayed comprising, a backing member, an information holder frame fixed on the backing member and having a viewing aperture therein, a substantially circular information dial rotatably disposed on the holder frame between the backing member and the holder frame so that a peripheral portion of the dial may be viewed through the viewing aperture, indicia means on the dial comprising a series of numerals arranged in numerical sequence adjacent the outer periphery of the dial and viewable through said viewing aperture, with the first and last numerals of the sequence spaced apart a distance substantially equal to the height of any one of said numerals so as to provide peripheral area on said dial which is devoid of indicia and which is viewable through said viewing aperture, at least one information display piece detachably supportable on the information holder frame and carrying therein selected information to be displayed and correlated with indicia on the dial displayed through said viewing aperture, and means operably interposed between the information holder frame and information display piece to detachably support the display piece on the holder frame.

2. The scheduling panel according to claim 1, in which said dial is provided with a series of equally spaced apertures circularly arranged adjacent the outer periphery of the dial.

3. The scheduling panel according to claim 1, in which said information holder frame is formed from flat sheet material in a generally quadrilateral configuration and has at least one viewing aperture therein adjacent one edge thereof through which a selected peripheral portion of the associated dial may be viewed.

4. The scheduling panel according to claim 1, in which said information holder frame is formed from flat sheet material and said means operably interposed between the information holder frame and information display piece includes a plurality of tab-receiving apertures formed in the information holder frame, and said display piece is provided with a plurality of tabs proportioned to lockingly engage said tab-receiving apertures.

5. The scheduling panel according to claim 1, in which said information holder frame is formed from an elongated sheet of material with opposite long edges of the sheet being recessed over substantial portions of their length, said recesses each constituting one of said viewing apertures.

6. The scheduling panel according to claim 1, in which said information holder frame is formed from flat sheet material in a generally quadrilateral configuration and has at least one display aperture therein adjacent one edge thereof, said display aperture having opposed sides and an inside edge perpendicular to such sides, and an angularly disposed fillet joining said inside edge to each adjacent side.

7. The scheduling panel according to claim 3, in which said identification holder frame is provided with a centrally disposed slot communicating with said viewing aperture and extending in a direction away from said aperture.

8. The scheduling panel according to claim 7, in which said slot adjacent its end remote from the display aperture is provided with at least one enlarged section constituting a pivot aperture.

9. A scheduling panel for collating information to be displayed comprising, a backing member, first, second and third information holder frames fixed on the backing member in superposed imbricated relation and each having a viewing aperture therein registering with the other associated viewing apertures, first, second and third information dials rotatably disposed, respectively, on said first, second and third information holder frames in a superposed imbricated relation so that a peripheral portion of each dial is viewable through the viewing aperture in the holder frame on which the dial is rotatably mounted, indicia means on each dial comprising a series of numerals arranged in numerical sequence adjacent the outer periphery of the dial and spaced thereabout so that only one numeral is viewable at one time through said viewing aperture, at least one display piece detachably supported on the top-most information holder frame and carrying thereon selected information to be displayed and correlated with the indicia on said first, second and third dials, and means operably interposed between the information holder frame and information display piece to detachably support the display piece on the holder frame.

10. The scheduling panel according to claim 9, in which a facing sheet is superposed over the top-most information holder frame and is secured thereto, said facing sheet being apertured to provide an opening overlying the apertures in said holder frames, and said display piece is detachably supported on the facing sheet.

11. The combination according to claim 9, in which a plurality of sets of said information holder frames and dials are provided, and means are disposed between adjacent sets thereof to distinguish one set from an adjacent set.

References Cited

UNITED STATES PATENTS

| | | | |
|---|---|---|---|
| 615,568 | 12/1898 | Moore et al. | 116—131 |
| 1,840,193 | 1/1932 | Feldman et al. | 40—5 |
| 1,933,013 | 10/1933 | Hamilton | 40—5 |
| 3,360,874 | 1/1964 | Myers | 235—114 XR |
| 549,131 | 11/1895 | James | 116—131 |
| 1,502,662 | 7/1924 | Fox | 235—114 |
| 1,689,055 | 10/1928 | Sanders | 40—40 |
| 1,694,048 | 12/1928 | White | 235—114 |
| 1,779,684 | 10/1930 | Sichlen | 40—70 |
| 1,951,022 | 3/1934 | Iverson | 235—114 |
| 2,493,477 | 1/1950 | De Baun | 235—114 |
| 2,544,389 | 3/1951 | Liphin | 235—74 |
| 2,842,314 | 7/1958 | McKennett | 235—74 |
| 2,842,877 | 7/1958 | Stevens | 116—133 |
| 3,017,087 | 1/1962 | Bodeen | 116—133 |
| 3,236,446 | 2/1966 | Lebrande | 235—111 |
| 3,227,365 | 1/1966 | Williams | 235—74 |

FOREIGN PATENTS

| | | |
|---|---|---|
| 19,413 | 1889 | Great Britain. |
| 834,781 | 3/1952 | Germany. |
| 272,122 | 2/1951 | Switzerland. |
| 277,830 | 12/1951 | Switzerland. |

LOUIS J. CAPOZI, Primary Examiner

U.S. Cl. X.R.

40—68